United States Patent
Thompson

(10) Patent No.: US 7,316,247 B2
(45) Date of Patent: Jan. 8, 2008

(54) APPARATUS AND METHOD FOR MAKING A COMMUNICATION CABLE SUPPORT STRUCTURE

(75) Inventor: William J. Thompson, Fullerton, CA (US)

(73) Assignee: Tomarco Contractor Specialties, Inc., Buena Park, CA (US)

( * ) Notice: Subject to any disclaimer, the term of this patent is extended or adjusted under 35 U.S.C. 154(b) by 0 days.

(21) Appl. No.: 11/225,576

(22) Filed: Sep. 13, 2005

(65) Prior Publication Data

US 2006/0027714 A1  Feb. 9, 2006

Related U.S. Application Data

(62) Division of application No. 10/663,511, filed on Sep. 16, 2003, now Pat. No. 6,945,501.

(51) Int. Cl.
*B21F 3/00* (2006.01)

(52) U.S. Cl. .............. 140/102.5; 140/102; 140/104

(58) Field of Classification Search ........... 140/102, 140/102.5, 104, 106, 75, 77, 81, 83, 92, 92.2, 140/80; 72/458
See application file for complete search history.

(56) References Cited

U.S. PATENT DOCUMENTS

| 350,209 | A | | 10/1886 | Parmelee | |
|---|---|---|---|---|---|
| 411,307 | A | | 9/1889 | Turner | |
| 538,213 | A | * | 4/1895 | Hieatzman | 140/80 |
| 556,318 | A | * | 3/1896 | Roux | 140/102 |
| 810,004 | A | | 1/1906 | Tabler | |
| 934,255 | A | | 9/1909 | Wilson | |
| 1,308,869 | A | | 7/1919 | Rohmer | |
| 1,331,524 | A | | 2/1920 | Pleister | |
| 1,365,060 | A | | 1/1921 | Pleister et al. | |
| 1,365,354 | A | | 1/1921 | Thayer | |
| 1,554,740 | A | | 9/1925 | Licht | |
| 1,590,027 | A | * | 6/1926 | Hern | 140/83 |
| 1,623,792 | A | | 4/1927 | Karitzky | |
| 1,750,694 | A | | 3/1930 | St. John | |
| 2,642,242 | A | | 6/1953 | Karitzky | |
| 2,846,174 | A | | 8/1958 | Sewell | |
| 2,862,368 | A | | 12/1958 | Dempsey | |
| 2,891,752 | A | | 6/1959 | Genter | |
| 3,039,498 | A | * | 6/1962 | Bechtell | 140/102 |
| 3,194,524 | A | | 7/1965 | Trumbull | |
| 3,204,908 | A | | 9/1965 | Brown | |
| 3,263,026 | A | | 7/1966 | Kihs | |
| 3,342,223 | A | * | 9/1967 | Hall et al. | 140/71 R |
| 3,504,108 | A | | 3/1970 | Kihs | |

(Continued)

FOREIGN PATENT DOCUMENTS

DE  2923893  1/1981

*Primary Examiner*—Amy J. Sterling

(57) ABSTRACT

A digital voice and/or data communication cable hanger provides a saddle support on a shaft fastened to a ceiling or beams or side wall by an integral fastening loop at one end. The other end of the hanger is shaped into a support loop for the cable. A saddle having the support shaft running through it closes the support loop to prevent cable from slipping out. The cable hanger is made by a tool using a rotating spool designed to shape the rigid shaft into a fastening loop at one end and a support loop at the other end. A second support loop can be selectively attached to the shaft between its ends.

4 Claims, 5 Drawing Sheets

U.S. PATENT DOCUMENTS

| | | |
|---|---|---|
| 3,532,312 A | 10/1970 | Kopf |
| 3,995,823 A | 12/1976 | Hensel |
| 4,438,894 A | 3/1984 | Yaotani et al. |
| 4,736,923 A | 4/1988 | Losada |
| 4,869,298 A * | 9/1989 | Motley ................ 140/102.5 |
| 4,903,920 A | 2/1990 | Merritt |
| 4,979,715 A | 12/1990 | Rancourt |
| 4,991,801 A | 2/1991 | Trumbull |
| 5,005,789 A | 4/1991 | Jones |
| 5,029,788 A | 7/1991 | Hoskinson et al. |
| 5,178,503 A | 1/1993 | Losada |
| 5,297,593 A * | 3/1994 | Holzman ................ 140/104 |
| 5,385,320 A | 1/1995 | Ismert et al. |
| 5,624,220 A | 4/1997 | Janssen et al. |
| 5,634,756 A | 6/1997 | Losada |
| 5,740,994 A | 4/1998 | Laughlin |
| 5,788,444 A | 8/1998 | Losada |
| 5,809,824 A * | 9/1998 | Hiltzman ................ 72/387 |
| 5,897,082 A | 4/1999 | Losada |
| 5,957,416 A | 9/1999 | Sellati |
| 6,325,338 B1 | 12/2001 | Del Re et al. |
| 6,364,266 B1 | 4/2002 | Garvin |
| 6,565,048 B1 | 5/2003 | Meyer |
| 2003/0102412 A1 | 6/2003 | Miescher |

* cited by examiner

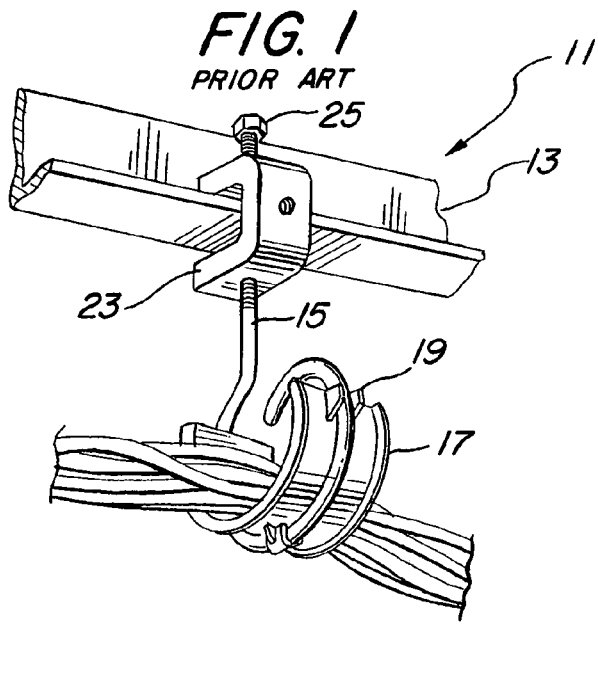
FIG. 1
PRIOR ART
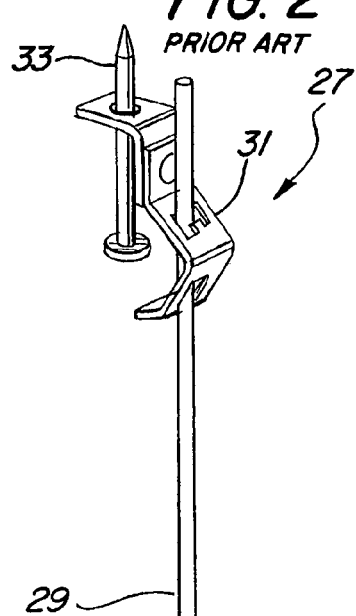
FIG. 2
PRIOR ART
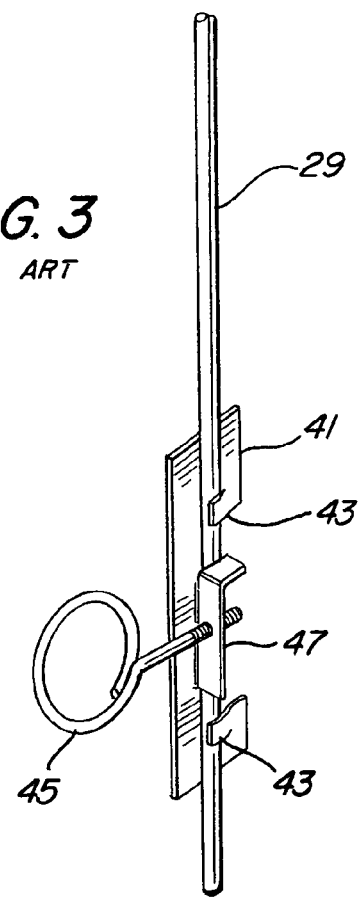
FIG. 3
PRIOR ART
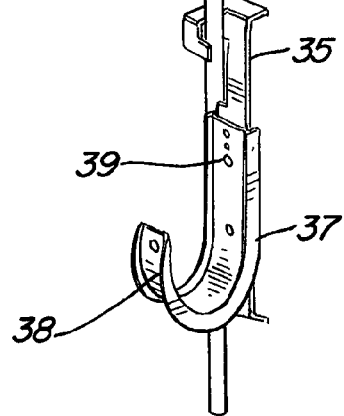

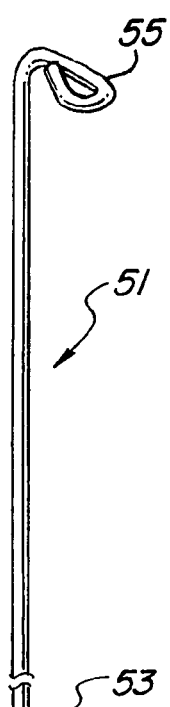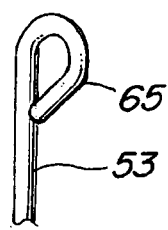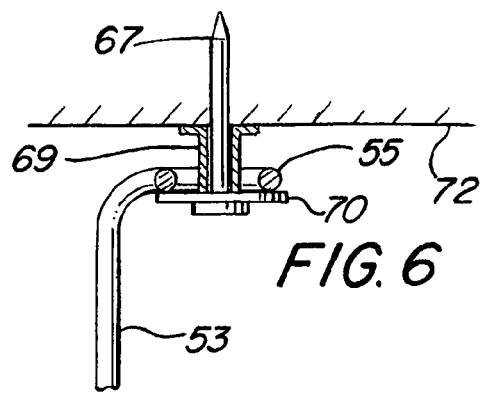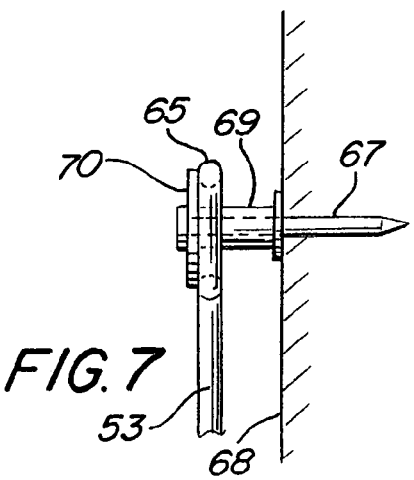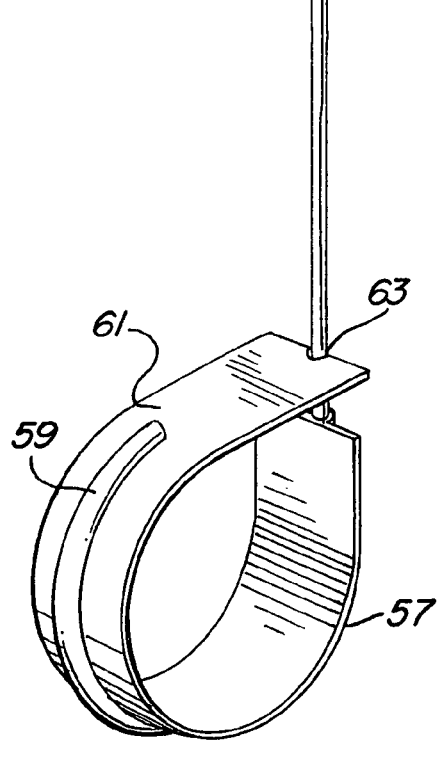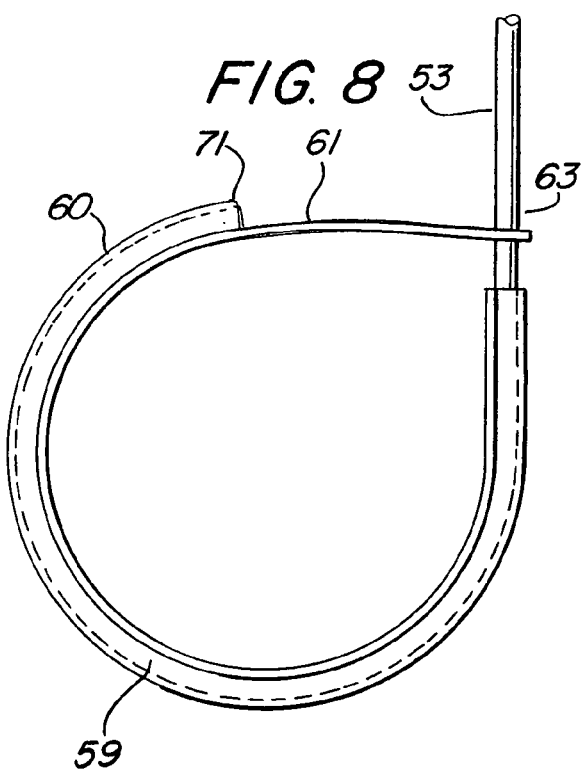

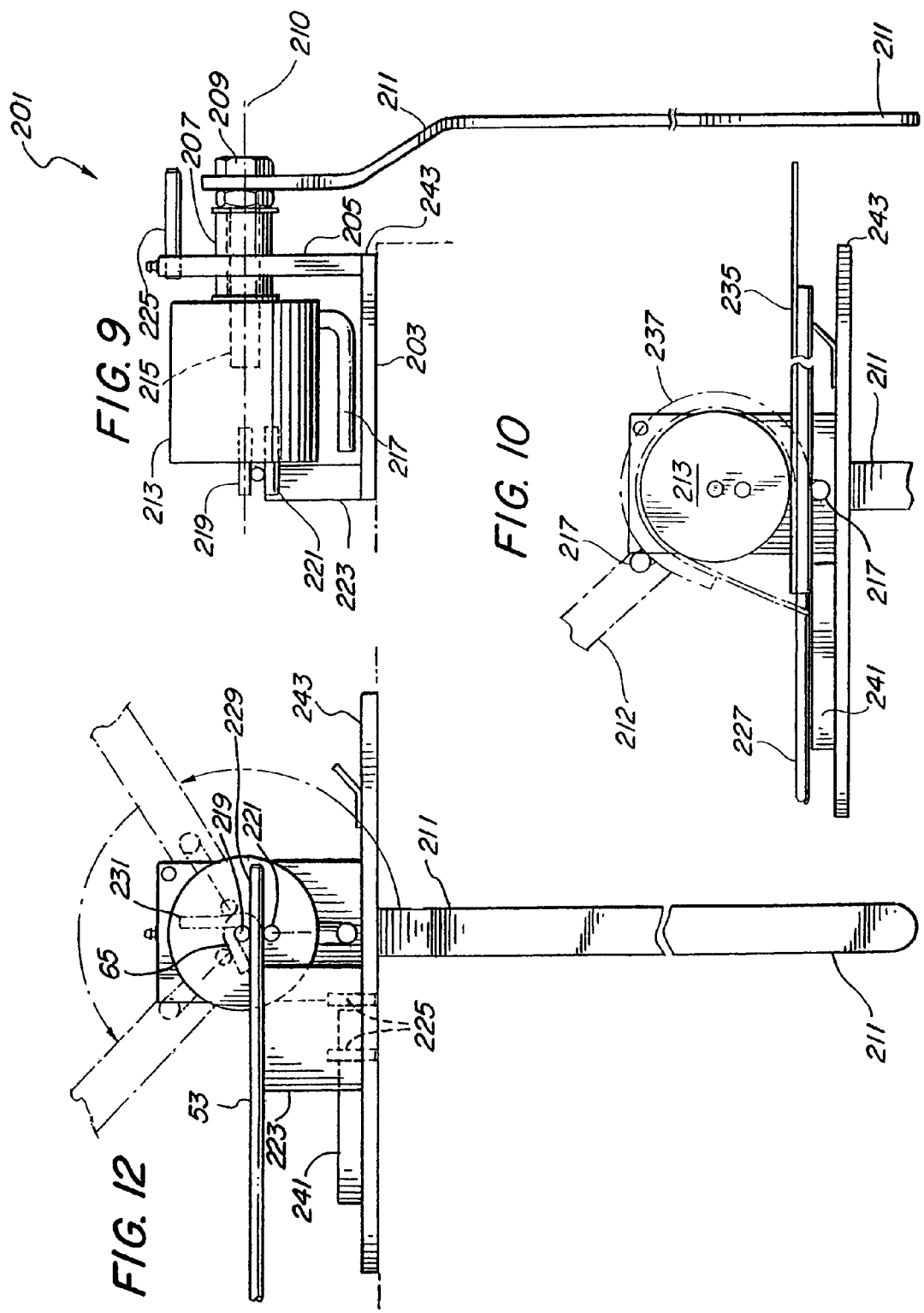

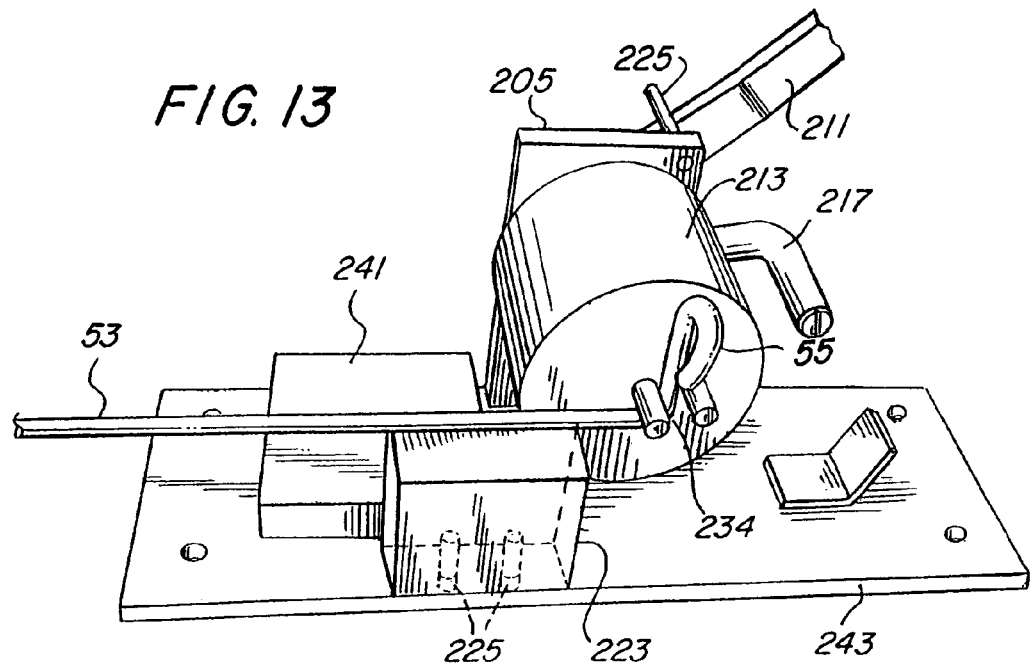
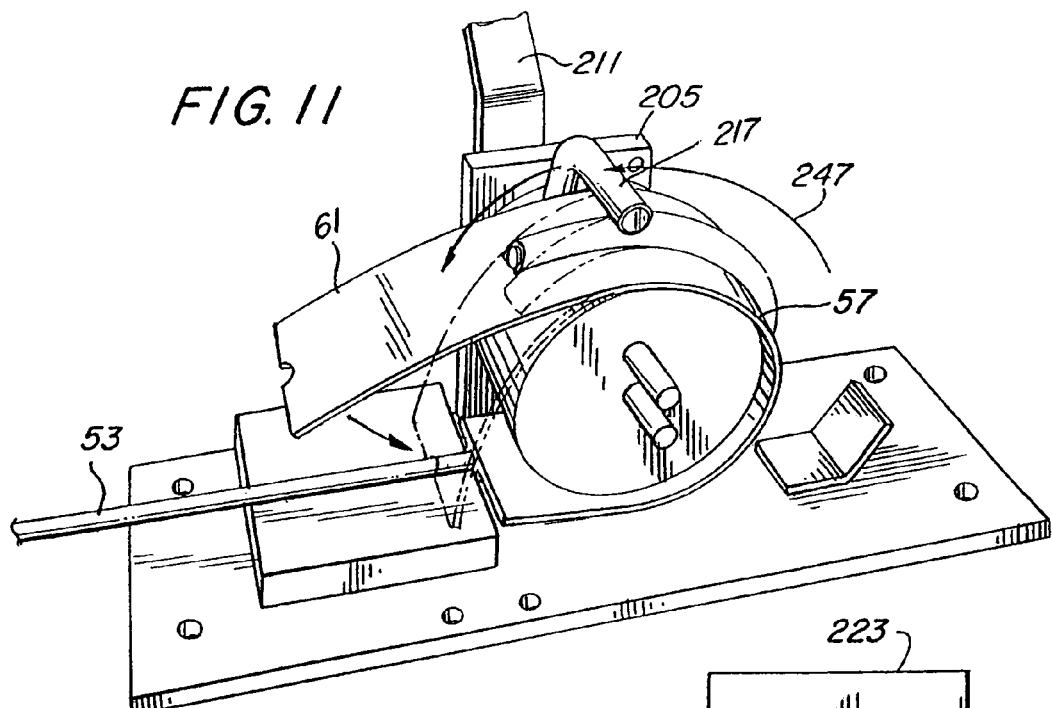
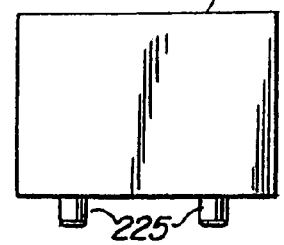

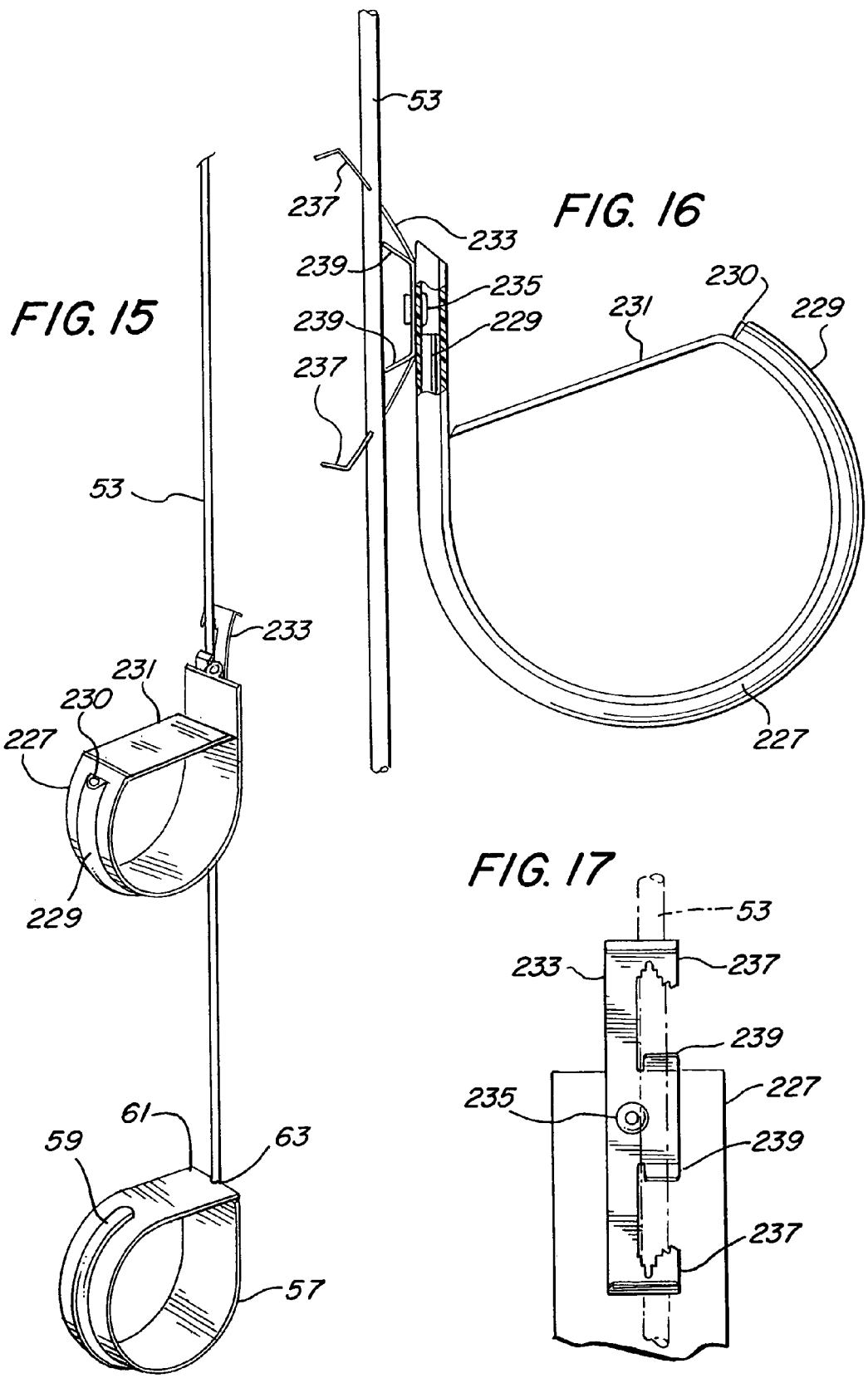

APPARATUS AND METHOD FOR MAKING A COMMUNICATION CABLE SUPPORT STRUCTURE

CROSS REFERENCE TO RELATED APPLICATION

This application is a division of application Ser. No. 10/663,511, filed Sep. 16, 2003 now U.S. Pat. No. 6,945,501.

BACKGROUND OF THE INVENTION

1. Field of the Invention

The present invention relates generally to improvements in cable support structures and more particularly pertains to new and improved apparatus for suspending digital voice and data cables in office buildings.

2. Description of the Prior Art

Digital voice and data communication cables used to interconnect computers and related digital equipment in office buildings, for the most, part require straight unconvoluted runs with the cables separated from power lines and other interference generating structures in order to avoid band-width deterioration.

As a result, the prior art has developed separate digital cable hangers. An example of several different types of cable hangers utilized in the prior art is shown in FIGS. 1, 2 and 3.

FIG. 1 illustrates a cable hanger 11 which is adapted for attachment to a metal support beam 13. The operative end of the cable hanger is a bridle ring 15 that threads into a U-shaped fastening block 23 that is held to a steel beam 13 by a fastening screw 25 threaded through fastening block 23. The bridle ring 15 has a plastic saddle 17 attached to the loop portion of bridle ring 15 by bosses 19 located on the underside of saddle 17, that squeeze the curved portion of the saddle ring 15. A digital cable bundle 21 is placed within the loop of saddle ring 15 on saddle 17.

FIG. 2 illustrates another prior art cable hanger 27 which is designed to fasten into a ceiling or horizontal support by way of a nail 33. The cable hanger 27 utilizes a straight length of wire rod 29 which is attached at one end to a clip 31 that also holds nail 33 and attached at the other end to a clip 35 which has a wire holding hook 38. The hook 38 is fastened by way of rivets 39 to a metal saddle 37. A bundle of wires or single digital communication cable would be placed within the saddle 37.

Yet another digital communication cable holder prior art device is illustrated in FIG. 3. A clip 41 cut out of flat metal has an upstanding portion 47 bent at a right angle into which a closed loop hook 45 is threaded. The clip 41 is held fast to a wire rod 29 by way of the pressure applied between the flat part of clip 41 and tabs 43 and the upstanding portion 47.

The prior art digital voice and data communication cable hanging device 11 of FIG. 1 is not completely satisfactory in that the bridle ring is open, and the length or support height at which the digital communication cable 21 is suspended from the support is not adjustable.

The prior art digital communication cable hangers of FIGS. 2 and 3 have an adjustability feature. FIG. 2, for example, shows a hook attached to wire 29 which can be moved up and down, and a bracket 31 holding nail 33, which can be moved up and down. The prior art device of FIG. 3 shows a closed loop 45 attached to a bracket 41 which can be moved up and down rod 29.

A shortcoming of the two prior art devices shown in FIGS. 2 and 3 is that the multiple parts used in the construction of the brackets that provide the adjustability, tend to create a structure that is flimsy, not capable of withstanding building movement caused by an earthquake, for example, and do not have a smooth, non-metallic wide surface loop or saddle that prevents kink and sags.

SUMMARY OF THE INVENTION

A digital voice/data communication cable hanger made of wire rod is shaped to be fastened to a concrete, wood, or metal overhead deck or side wall by an integral fastening loop at one end that provides a stabilizing footprint on the substrate. A cable support loop at the other end of the wire rod has a saddle integrally attached, for cradling the digital cable. The saddle is designed to close the cable support loop with a latch arm, after the cable is run through, to prevent the cable from slipping out. The hanger is preferably made from rigid wire rod by a double functioning spool which forms the fastening loop at one end and the support loop at the other end. The support loop is formed with the saddle attached to the wire rod. A second saddle designed to be selectively attached to the wire rod between its two ends may be used as needed for running additional digital cable.

BRIEF DESCRIPTION OF THE DRAWINGS

The exact nature of this invention, as well as its objects and advantages, will become readily apparent upon consideration of the following description of a preferred embodiment of the invention as illustrated in the accompanying sheets of drawings in which:

FIG. 1 is a perspective illustration of a prior art device.

FIG. 2 is a perspective illustration of an alternate prior art device.

FIG. 3 is a perspective illustration of yet another prior art device.

FIG. 4 is a perspective illustration of a preferred embodiment of the present invention.

FIG. 5 is a perspective illustration of a section of an alternate structure for the fastening loop.

FIG. 6 is a cross-sectional view showing how the fastening loop is attached to an overhead deck.

FIG. 7 is a side view showing how the fastening loop of FIG. 5 is attached to a side wall.

FIG. 8 is a side view of the cable support loop portion of the invention, for holding a digital communication cable.

FIG. 9 is an end plan view of an apparatus for making the small and large fastening loops on a communication cable support structure according to the present invention.

FIG. 10 is a side plan view of the apparatus of FIG. 9 shown making the large support loop on a communication cable support structure according the present invention.

FIG. 11 is a perspective illustration of the apparatus of FIG. 10 showing the formation of of the large support loop with intergral saddle on the shaft.

FIG. 12 is a side plan view of the apparatus of FIG. 9 showing use of the apparatus for forming the small fastening loop on an end of the shaft.

FIG. 13 is a perspective illustration showing the apparatus of FIG. 12 forming a right angle bend in the small fastening loop portion of the present invention.

FIG. 14 is a front plan view of a removable platform used to form the small closed fastening loop.

FIG. 15 is a perspective view of an alternate embodiment of the invention.

FIG. 16 is a side plan view with a partial section of part of the structure of FIG. 18.

FIG. 17 is a front plan view of the cable holding mechanism of FIGS. 15 and 16.

DETAILED DESCRIPTION OF THE PREFERRED EMBODIMENTS

The preferred embodiment of a communication digital audio/video cable support 51, according to the present invention, is illustrated in FIG. 4 as comprising a metal shaft 53 which may be 8-gauge or higher, zinc plated mild steel rod, or similar shaft. The shaft 53 may be round, triangular or rectangular in shape, although round is preferred. For drop lengths greater than one foot, a 0.250 round steel rod having 65KSI tensile strength is preferred. The shaft 53 has a small loop 55 formed at its first end with a 90° bend just below the loop 55 for fastening the communication cable support structure 51 to a ceiling. The small loop 55 is the fastening loop.

The other or second end of shaft 53 is formed into larger loop 59 which has a saddle 57 of a very specific construction integral with the shaft 53. As is more clearly shown in FIG. 8, the saddle 57 has an integral sleeve 60 formed in the saddle. The saddle is preferably made out of plastic by an injection molded process. The sleeve 60 of saddle 57 extends from just before the shaft 53 starts to bend into a loop 59 and ends at the end 71 of the shaft 53. The remaining portion 61 of the material of saddle 57 has no sleeve thereon, is flat, and extends to close the open space between the end 71 of shaft 59 and the straight shaft 53. This flat part 61 of the saddle 57 has a notch 63 at its end to allow friction closure with shaft 53. The flat part 61 of the saddle 57 is sufficiently flexible to rotate away from shaft 53 and open the loop 59 as required to place or remove wires from the support loop. The saddle is preferably a two inch to three and one-half inch closed loop made out of polypropylene resin or similar material.

FIG. 5 illustrates a fastening loop 65 without a bend in it. This fastening loop is utilized for attachment to overhead side walls 68 as shown in FIG. 7. A fastener 67 like a timber pin for wood, or a ramset for concrete or a drill screw for a metal deck, for example, is held within the small fastening loop 65 by a collapsible bushing 69 on one side of the loop 65 and a washer 70 on the other side. The fastener 67 is driven into the vertical side wall surface 68 with a force sufficient to collapse bushing 69 so that the fastening loop 65 is flat against the vertical surface 68. Bushing 69 is preferably made out of a light-weight plastic, nylon, or foam material.

For overhead attachments to horizontal decks, as shown in FIG. 6, the 90° bend version of the cable support structure 51 is utilized. The fastener 67, which may be a ramset or drill screw, for example, is held to the small fastening loop 55 by a bushing 69 on one side and a washer 70 on the other. Bushing 69 is made out of a plastic, nylon, or foam material that will collapse when the fastener 67 is driven fully into the horizontal surface 72.

The unitary structure of the cable support 51 is a significant advantage when supporting digital video/audio cables in an environment where support sways and sturdiness is an important consideration.

The unitary construction of the communication cable support structure 51 also is of significant advantage from the standpoint of its manufacture, in that it can be made simply, quickly and cheaply by a simple hand-operated apparatus as shown in FIGS. 9-14.

FIG. 9 shows the manufacturing apparatus 201 for making the cable support structure 51 having a spindle or spool 213 mounted for rotation about its central axis 210. The spindle 213 is preferably made of steel in a drum shape, i.e. a generally cylindrical shape having first and second ends and a side of fixed diameter extending axially between the two ends. A shaft 215 fixed to one end of the spool 213 is a journal within a bearing casing 207. A long-handled lever 211 is attached to the other end of shaft 215 by a pair of bolts 209. Rotation of lever 211 causes spool 213 to rotate about its central axis 210. Bearing casing 207 is held in position by a support wall 205 made of steel which is fixed to a sturdy base 243.

Spool 213 has a steel arm 217 with an elongated portion and an elbow portion. The elongated portion extends parallel to the central axis 210 of spool 213, as shown. Arm 217 is fastened by welding (or an equivalent fastening means) the elbow portion of arm 217 to an outer surface of the side of spool 213 so that the elongated portion of arm 217 rotates with spool 213 at a fixed radial distance from the central axis 210.

A pair of pegs 219 and 221 are attached to the other end of spool 213 at an outer surface, as shown. One peg 219 is on the central axis 210 of the spool 213. The other peg 221 is displaced a short distance from the central axis peg 219. The distance between the two pegs is determined by the diameter of the shaft or rod 53 to be manipulated by the manufacturing apparatus 201.

FIGS. 12 and 13 show the manufacturing apparatus 201 being used to make the small fastening loop 65 and 55, respectively, at the first end of the shaft 53. A platform 223 is mounted to the base 243 by a pair of pegs 225 that insert into matching apertures in the base 243. This allows the platform to be removed during other operations of the apparatus 201. Platform 223 has a surface lying along a line between central axis 210 and peg 221 for supporting shaft 53 when shaft 53 is inserted between the two pegs 219 and 221 on the end of the spool 213. As shown in FIG. 12, rotation of the long-handled lever 211 in a counterclockwise direction 202 causes the straight shaft end 229 to be bent into the closed loop 65.

In order to place the 90° bend 234 (FIG. 13) into the shaft 53, the end of the shaft with a small fastening loop 65 is turned 90 degrees and again inserted between the pegs 219 and 221. The long-handled lever 211 is rotated in a counterclockwise direction to a stop 225 which is threadably attached to the support wall 205. This limited movement provides a 90° angle bend 234 in the shaft 53, thereby converting a loop 65 into a loop 55 as required for attaching the cable support structure 51 to a horizontal overhead deck.

In order to form the large holding loop at the second end of the shaft 53, the spool 213 is utilized as shown in FIGS. 10 and 11.

Before the manufacturing apparatus 201 is utilized, the saddle 57 is slid on to the straight end of shaft 53 so that the support end 59 of shaft 53 slips into the entire length of the sleeve 60 that is an integral part of saddle 57. The flat end 61 of the saddle continues beyond the end 71 of the shaft 59 in the saddle 57. The still flat saddle with the shaft 53 attached is then inserted between the arm 217 and the spool 213 as shown in FIG. 10.

Rotation of the long-handled lever 211 in a counterclockwise direction 247 causes the saddle 57 and the end 59 of the shaft 53 that is in the sleeve 60 of the saddle to bend into a loop as shown in FIG. 11. The flat portion 61 of the saddle that extends beyond the end 71 is of sufficient length to close the open loop formed.

This manufacturing process described above, although hand operated, is fast and efficient, and produces a cable support structure 51 that is strong and rigid, capable of withstanding the forces exerted on it by the pulling of cable through the saddle supports and the forces exerted on it during overhead mounting to horizontal decks or walls. The length of the shaft 53 from the small fastening loop 55 to the large support loop in saddle 57 may vary in length. Preferably the cable support 51 comes in a variety of standard lengths to be used as needed for running the communication cable from an overhead support.

In those instances where additional cable needs to be run at some time after installation of the cable support structure 51 and at a different height than established by the cable support structure 51, an additional saddle 227 may be mounted to shaft 53 along its midsection as shown in FIGS. 15 and 16. Saddle 227 is constructed in the same manner as saddle 57 with a integral sleeve 229 formed in saddle 227 which contains a rod 230 that shapes saddle 227 by being bent into a loop, as shown in FIGS. 15 and 16. The remaining portion of the saddle 231 which has no sleeve is flat and extends to close the open space between the straight shaft 53 and the end of the bent shaft 230. The flat portion 231 of the saddle engages the flat side of the saddle 227 at the shaft 53 to provide complete closure of the saddle loop.

The saddle 227 is held to shaft 53 by a rod grasping mechanism 233 that has a pair of outside arms 237 and a pair of inside arms 239. The rod grasping mechanism 233 as shown in FIGS. 16 and 17 is held fast to the saddle 227 by at least one rivet, or bolt or similar fastener 235. The grasping mechanism 233 is preferably made out of a spring steel. It is shaped so that the rod 53 is grasped between an inside arm 239 and an outside arm 237 of the grasping mechanism 233. Multiple arms are shown in the Figures because multiple arms are preferred to provide the additional holding force required. Although two holding arms are illustrated, more or less could be used, as needed.

What is claimed is:

1. An apparatus for making a cable support structure having a shaft with a fastening loop at a first end of the shaft and a support loop at a second end of the shaft, the apparatus comprising:
   a structure mounted for rotation about an axis of rotation;
   a pair of pegs mounted to an outer surface of the rotating structure, a first peg on the axis of rotation, a second peg displaced a fixed distance from the axis of rotation;
   an arm mounted to an outer surface of a side of the rotating structure parallel to the axis of rotation and extending parallel to the axis of rotation at a fixed radial distance from the axis of rotation;
   a support for the shaft of the cable support structure, the support having a surface lying along a line between the axis of rotation and the second peg for supporting the shaft of the cable support structure at the second end when the first end of the shaft is placed between the pair of pegs on the rotating structure; and
   a second support for the shaft of the cable support structure, the second support having a surface lying along a line between the side of the rotating structure and the parallel extending arm for supporting the shaft of the cable support structure at the first end when the second end of the shaft is placed between the rotating structure and the arm.

2. The apparatus of claim 1, further comprising:
   a handle with a lever attached to one end of the rotating structure at the axis of rotation for rotating the structure about the axis.

3. An apparatus for making a cable support structure having a shaft with a fastening loop at a first end of the shaft and a support loop at a second end of the shaft, the apparatus comprising:
   a spool mounted for rotation about a central axis, the spool having a first end and a second end and a side of predetermined diameter extending axially therebetween;
   an arm mounted to an outer surface of the side of the spool for rotation therewith, and extending parallel to the central axis at a fixed radial distance from the central axis;
   a first and a second peg mounted to the first end of the spool, the first peg on the central axis of the spool, the second peg displaced a fixed distance from the first peg; and
   a first support for the shaft of the cable support structure, the first support having a surface lying along a line between the side of the spool and the parallel extending arm for supporting the shaft of the cable support structure at the first end when the second end of the shaft is placed between the spool and arm; and
   a second support for the shaft of the cable support structure, the second support having a surface lying along a line between the central axis and the second peg for supporting the shaft of the cable support structure at the second end, when the first end of the shaft is placed between the first and second pegs on the spool.

4. The apparatus for making a cable support structure of claim 2, further comprising:
   a handle with a lever attached to the second end of the spool at the central axis for rotating the spool about the central axis.

* * * * *